June 14, 1927.
L. C. WOODYARD
WIRE STRETCHER
Filed Oct. 2, 1922
1,632,016
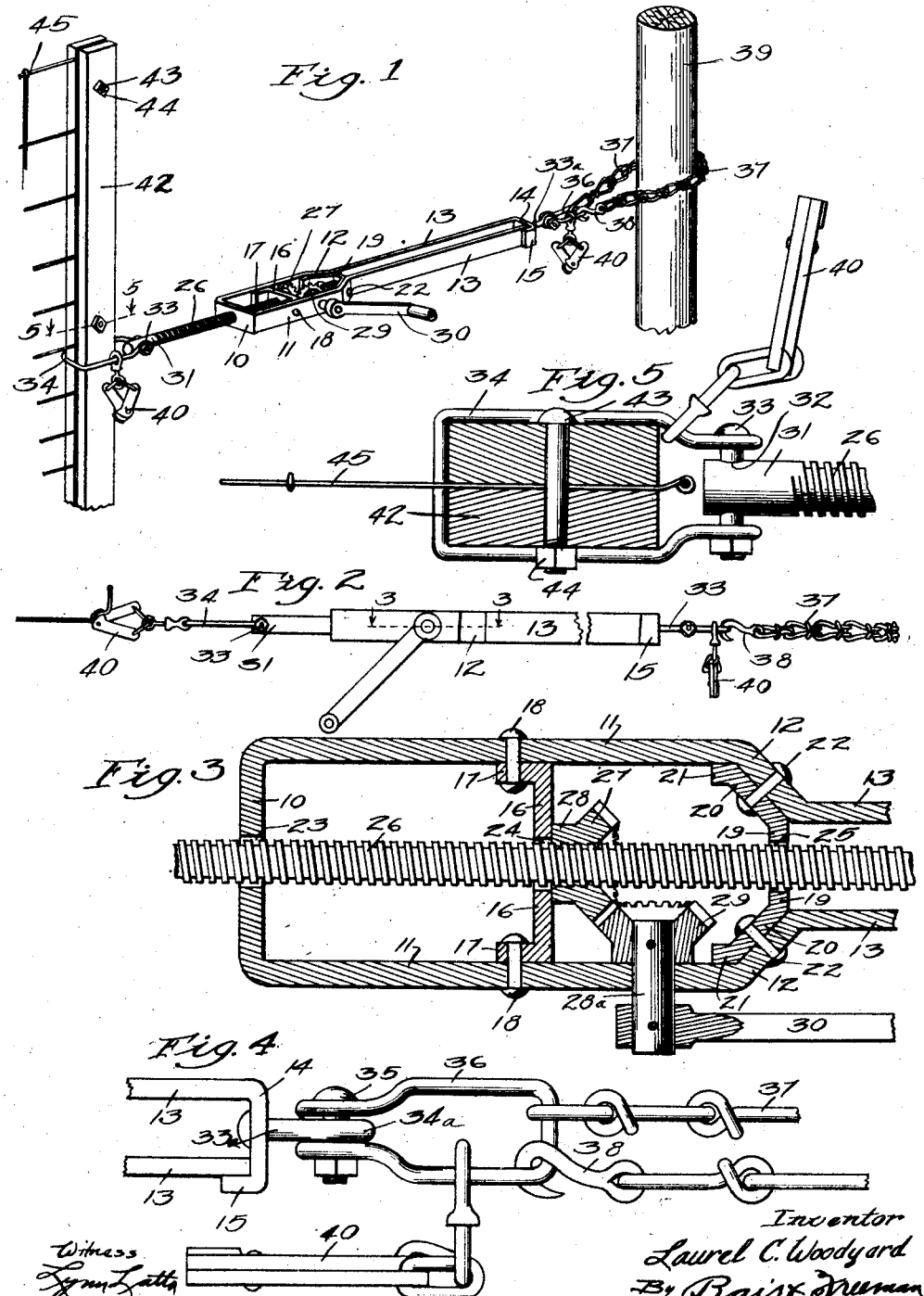

Patented June 14, 1927.

1,632,016

UNITED STATES PATENT OFFICE.

LAUREL C. WOODYARD, OF LACONA, IOWA.

WIRE STRETCHER.

Application filed October 2, 1922. Serial No. 591,791.

The object of my invention is to provide a combined barbed and woven wire structure of simple, durable and inexpensive construction.

More particularly, it is my object to provide a structure having mechanism and parts of novel and simple construction, which device can be readily adapted for use in stretching woven wire fence or ordinary straight or barbed wire.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 shows a perspective view of a combined barbed and woven wire fence stretcher embodying my invention, illustrating one manner of using the device for stretching woven wire.

Figure 2 shows a side elevation of my device.

Figure 3 shows a horizontal, sectional view taken on the line 3—3 of Figure 2.

Figure 4 shows an enlarged, top or plan view of part of the device; and

Figure 5 shows a detailed, sectional view taken on the line 5—5 of Figure 1.

It is my purpose to provide a device, which can be readily and easily operated for stretching wire in building fences.

I desire to make such a device, which can be operated with a minimum of effort, and which can be readily and easily released under tension, if that should be necessary, and which can be operated for drawing the wire to any tension and then simply released without danger of losing the tension on the wire.

My improved stretcher comprises a frame, which is preferably made of a single piece or bar of metal, having at one end the transverse member, indicated in the accompanying drawings, by the reference numeral 10.

At the ends of the member 10, the strip is bent to form parallel spaced members 11, extending away from the member 10, as shown in Figures 1 and 3.

At points substantially spaced from the member 10, the bar or strip portions are inclined inwardly toward each other, as at 12, and are then inclined away from the member 10 in parallel relation with each other as at 13.

At the end of the frame opposite the member 10 one of the members 13 is bent across parallel with the member 10 and around the end of the other member 13 as shown in Figure 1 at 14 and 15.

The member 15 is preferably secured to the adjacent member 13 by welding or otherwise.

In position spaced from the cross member 10, a cross member 16 having flanges 17 connects the members 11 and forms a brace and supporting member. The flanges 17 are preferably secured to the members 11 by rivets, bolts or the like 18.

A cross member 19 extends between the members 12 adjacent to the members 13 and has at its ends, inclined portions 20 fitting against the inner surfaces of the members 11, as shown in Figure 3.

The members 20 may be secured to the members 12 by rivets or the like 22.

In the members 10, 16 and 19 are holes 23, 24 and 25 arranged in alignment with each other. A threaded rod 26 is extended through the holes 23, 24 and 25, which serve as guides and supports for said rod.

In the drawings, I have shown the holes slightly enlarged in order to clearly illustrate them. As a matter of fact, they are just large enough to snugly fit the threaded rod and yet to permit its free movement.

Adjacent to the cross members 16 on its side next to the cross member 19, there is mounted on the threaded rod 26 a beveled gear 27, having a hub 28 provided with interior screw-threads to coact with the thread of the rod 26.

Mounted in one of the members 11, as shown for instance in Figure 3 is a short shaft 28$^a$. On the inner end of the shaft 28$^a$ in mesh with the beveled gear 27 is fixed a beveled gear 29.

On the outer end of the shaft 28$^a$ outside the frame hereinbefore referred to is a crank handle 30. The end of the threaded rod 26, which projects away from the frame, is preferably smooth as shown at 31 in Figures 1 and 5, and is provided with a hole 32 to receive a clevis pin 33 for connecting a clevis 34 to the threaded rod 26.

Mounted in the member 14 is an eye bolt 33$^a$ shown in Figures 1, 2 and 4 mounted for free rotation. The eye 34$^a$ of the eye bolt 33ᵃ is designed to receive a bolt or clevis pin 35, whereby a clevis 36 may be secured to the main frame of the device.

A chain 37 is preferably secured to the clevis 36 and is provided at its free end with a hook 38. The chain 37 may be put around the post 39 for anchoring the stretcher if desired.

I preferably loosely mount on the clevis 36 a wire clamp device 40, which can be used, if desired, where the stretcher is anchored to a wire instead of to a post.

It will be seen that by slipping out the pin or bolt 35, the wire clamp device 40 may be removed from the clevis and fastened to the hook 38.

It is also obvious that by removing the pin 35, the chain may be taken off the stretcher when desired.

A similar wire gripping device or clamp 40 is loosely mounted on the clevis 34, so that it may be secured to a single strand of barbed wire or plain wire when desired.

I provide as a part of my stretcher a pair of upright members, which may be boards or otherwise 42, arranged parallel with each other and held together by means of bolts 43 and nuts 44. The bolts 43 may be removed and the end of a section of woven wire fence 45 may be placed between the boards 42 and thereafter the bolts 43 are inserted through the boards 42 and the nuts 44 tightly screwed thereon.

The user may then slip the clevis 34 around the board 42, as shown in Figure 1, and fasten the clevis to the threaded rod 26.

When the other end of the stretcher is then anchored, as shown in Figure 1 by securing the clamp 40 at the right-hand end of the device to an anchored wire, the device is ready for use.

It will, of course, be understood that when the parts are first assembled and connected with the woven wire fence or with a barbed wire or plain wire, which is to be stretched, the threaded rod 26 is near the left-hand end of its movement, as shown for instance in Figure 1.

The user simply operates the crank 30 for drawing the threaded rod 26 inwardly toward the ends 14 of the frame and the fence wire will be stretched.

The user can stop operating the crank at any time, and there is no danger of the device accidentally reversing itself for releasing the tension on the fence.

Ordinary smooth wire or barbed wire can be stretched by using the clamps 40.

By providing the stretcher with the clevis 34 and the eyebolt 33ᵃ and the clevis 36, it is made so that it can be readily adapted for stretching any kind of wire fence.

The use of the clevis 34 and pin 33, the latter being extended through the threaded rod 26, is such as to prevent rotation of the rod 26 during the operation of the crank handle 30, because the clevis 34 can not rotate on account of the boards 42.

Even in stretching a single strand of wire, the operator can grasp the frame of the device, and it is not difficult to prevent its rotation.

The spaced members 13 afford between them room for the threaded rod 26 and serve to protect the threads, when the device is not in use.

I claim as my invention:

In a wire stretcher, a frame having end members and longitudinal side members, said side members being spaced to accommodate gearing and bent inwardly at an angle between their ends whereby a portion of the sides are spaced closer together, a cross element secured to the inwardly bent portions of the side members and a second cross element spaced from the first one, a threaded rod loosely journalled in said cross elements and one end of the frame, a bevelled gear having a threaded connection with the rod and arranged abutting the second cross element, a shaft journalled in one longitudinal member, having on one end a bevelled gear meshing with the first bevelled gear and on the other end an operating means, whereby the rod can be moved longitudinally with a minimum tendency to bind and fastening means connected with the frame and rod respectively.

LAUREL C. WOODYARD.